United States Patent [19]

Couture et al.

[11] Patent Number: 5,418,437

[45] Date of Patent: May 23, 1995

[54] MOTOR VEHICLE DRIVE SYSTEM FOR A MOTOR VEHICLE HAVING AN ELECTRIC MOTOR SYSTEM, AND A METHOD OF OPERATING SAID DRIVE SYSTEM

[75] Inventors: Pierre Couture, Boucherville; Bruno Francoeur, Loretteville, both of Canada

[73] Assignee: Hydro-Quebec, Montreal, Canada

[21] Appl. No.: 975,331

[22] Filed: Nov. 16, 1992

[51] Int. Cl.⁶ .................. B60L 11/02; B60K 41/00; B60K 7/00

[52] U.S. Cl. ............................ 318/139; 290/17; 180/65.4; 180/65.5

[58] Field of Search ................ 318/139, 140, 141; 290/9, 10, 11, 14, 16, 17, 45, 46; 180/65.1, 65.3, 65.4, 65.5, 65.8

[56] References Cited

U.S. PATENT DOCUMENTS

| | | | |
|---|---|---|---|
| 3,421,596 | 1/1969 | Christenson et al. | 180/44 |
| 3,650,345 | 3/1972 | Yardney. | |
| 3,719,881 | 3/1973 | Shibata et al. | |
| 3,792,327 | 2/1974 | Waldorf. | |
| 3,792,742 | 2/1974 | Mager | 180/65 F |
| 4,089,384 | 5/1978 | Ehrenberg. | |
| 4,099,589 | 7/1978 | Williams. | |
| 4,199,037 | 4/1980 | White | 180/65 |
| 4,211,930 | 7/1980 | Fengler. | |
| 4,292,531 | 9/1981 | Williamson. | |
| 4,351,405 | 9/1982 | Fields et al. | |
| 4,495,451 | 1/1985 | Barnard | 318/150 |
| 4,809,803 | 3/1989 | Ahern et al. | |
| 4,913,258 | 4/1990 | Sakurai et al. | 180/242 |
| 4,928,227 | 5/1990 | Burba et al. | 364/424.01 |
| 4,951,769 | 8/1990 | Kawamura | 180/65.4 |

FOREIGN PATENT DOCUMENTS

| | | |
|---|---|---|
| 0073861 | 3/1983 | European Pat. Off. . |
| 0460850 | 12/1991 | European Pat. Off. . |
| 2592342 | 7/1987 | France . |
| 3041922 | 6/1982 | Germany . |
| 1407951 | 10/1975 | United Kingdom . |
| 2170664 | 8/1986 | United Kingdom . |
| 2252689 | 8/1992 | United Kingdom . |
| 86/06009 | 10/1986 | WIPO . |

OTHER PUBLICATIONS

Lawrance, W. B. et al., "Microprocessor Control of a Hybrid Energy System", Proceedings of the 24th Intersociety Energy Conversion Engineering Conference, vol. 2, pp. 737-741, Aug. 6-11, 1989, Washington, D.C.

*Primary Examiner*—Bentsu Ro
*Attorney, Agent, or Firm*—Foley & Lardner

[57] ABSTRACT

The motor vehicle drive system is for a motor vehicle having an electric motor system, an actuating system, an accelerator system, a mode selector and a battery. The drive system comprises a power supply bus having an output for supplying the electric motor system; a battery connector for connection to the battery, the connector having a power output for supplying the power supply bus; a controller system having inputs respectively for connection to the components of the vehicle so that it can monitor their status; a power converter system connected to the power supply bus of the controller system, and to the motor system for supplying it; a combustion motor electric power supply having an input connected to the controller system, and an output for producing current; a first power converter having an input connected to the power supply, and an output for supplying the power supply bus, the controller system being connected to the power converter so that it is monitored and controlled by the controller system, whereby the controller system monitors and controls operation of the electric motor system and, when auxiliary electric power is needed on the power supply bus, the controller system activates operation of the combustion power supply.

12 Claims, 2 Drawing Sheets

MOTOR VEHICLE DRIVE SYSTEM FOR A MOTOR VEHICLE HAVING AN ELECTRIC MOTOR SYSTEM, AND A METHOD OF OPERATING SAID DRIVE SYSTEM

The present invention relates to a motor vehicle drive system for a motor vehicle having an electric motor system, an actuating system, an accelerator system, a mode selector and a steering wheel; and to a method of operating said drive system.

BACKGROUND OF THE INVENTION

Known in the art is U.S. Pat. No. 4,211,930, granted on Jul. 8, 1980 to Werner H. FENGLER. This patent describes an engine-driven-alternator individual-wheel-motorized electric propulsion system for a four-wheel motor vehicle provided with a steering mechanism. The system comprises an engine-driven two-phase alternator having a two-phase alternator output, a plurality of electric stepping motors adapted to be drivingly connected one to each vehicle wheel, a storage battery, a pulse-responsive electric power system including a plurality of gate-controlled rectifiers having power current input means and also having power current output means, and a stepping motor control circuit interposed between and connecting said alternator output to said motor inputs and including switching means connected to the gates of said gate-controlled rectifiers and responsive to the reception of positive or negative pulses for selectively energizing first and second windings of the stator pole pieces separately and simultaneously and thereby effecting step-by-step rotation of the rotors. As can be seen, the engine-driven two-phase alternator provides most of the energy to supply the stepping motors. The battery is used only when additional energy is needed. One drawback is that most of the energy is supplied by the alternator which requires consumption of fuel.

Also known in the art is U.S. Pat. No. 4,951,769, granted on Aug. 28, 1990 to Hideo KAWAMURA. The motor vehicle drive system described in this patent uses only the battery for supplying the vehicle accessories.

Also known in the art is U.S. Pat. No. 4,928,227 et al, granted on May 22, 1990, to Joseph C. BURBA et al, in which there is described a method for controlling a motor vehicle powertrain where the vehicle is powered either by a battery or by a gas powered motor generator.

Also known in the art is U.S. Pat. No. 3,792,742, granted on Feb. 19, 1974, to Charles J. MAGER, in which there is described an electric motor powered vehicle operating essentially on batteries.

Also known in the art is U.S. Pat. No. 3,421,596, granted on Jan. 14, 1969 to H. W. CHRISTENSON et al. In this patent, there is described a transmission for a vehicle where each wheel of the vehicle is driven by an electric motor. The vehicle has an internal combustion engine as its prime mover.

Also known in the art is U.S. Pat. No. 4,495,451, granted on Jan. 22, 1985 to Maxwell K. BARNARD. In this patent, there is described an internal energy interchange system for interchanging energy between driving wheels and flywheels. The system is essentially powered by an internal combustion engine.

Also known in the art is U.S. Pat. No. 4,913,258, granted on Apr. 3, 1990, to Hiroshi SAKURAI. In this patent, there is described an electric vehicle which is essentially powered by electrical energy.

None of the above patents provides a motor vehicle driving system comprising a powered battery and a combustion motor electric power supply where the powered energy is primarily provided by the power battery to keep to a minimum the consumption of fuel.

It is an object of the present invention to provide a motor vehicle drive system for a motor vehicle where a power supply bus is primarily supplied by a battery, and where a combustion motor electric power supply provides auxiliary energy when predetermined conditions are met.

It is another object of the present invention to provide a motor vehicle drive system primarily powered by a battery which is smaller than the one used in the prior art.

SUMMARY OF THE INVENTION

According to the present invention, there is provided a motor vehicle drive system for a motor vehicle having an electric motor system, an actuating system, an accelerator system, a mode selector and a battery, comprising:

a power supply bus having an output for supplying said electric motor system;

a battery connector for connection to said battery, said connector having a power output for supplying said power supply bus;

a controller system having inputs respectively for connection to said battery, said actuating system, said accelerator system, said mode selector and said electric motor system so that said controller system can monitor their status;

a power converter system having a first input connected to said power supply bus, a second input connected to an output of said controller system, operation of said power converter system being be controlled by said controller system, and an output connected to said motor system for supplying said motor system;

a combustion motor electric power supply having an input connected to an output of said controller system, operation of said power supply being controlled by said controller system, and an output for producing current;

a first power converter having an input connected to said output of said power supply, and an output for supplying said power supply bus, said controller system being connected to said power converter so that said power converter is monitored and controlled by said controller system, whereby said controller system monitors and controls operation of said electric motor system and, when auxiliary electric power is needed on said power supply bus, said controller system activates operation of said combustion power supply.

According to the present invention, there is also provided a method for operating a motor drive system on a vehicle, said drive system comprising a battery and a combustion motor electric power supply, such method comprising steps of:

providing primary power for driving an electric motor by means of said battery;

sensing when auxiliary power for said motor is required;

providing said auxiliary power to said motor from said power supply.

Other objects, features and advantages of the present invention will become more apparent in light of the detailed description of the preferred embodiments set forth hereafter, and illustrated in the accompanying drawings.

DETAILED DESCRIPTION OF THE PREFERRED EMBODIMENTS

Figure 1:
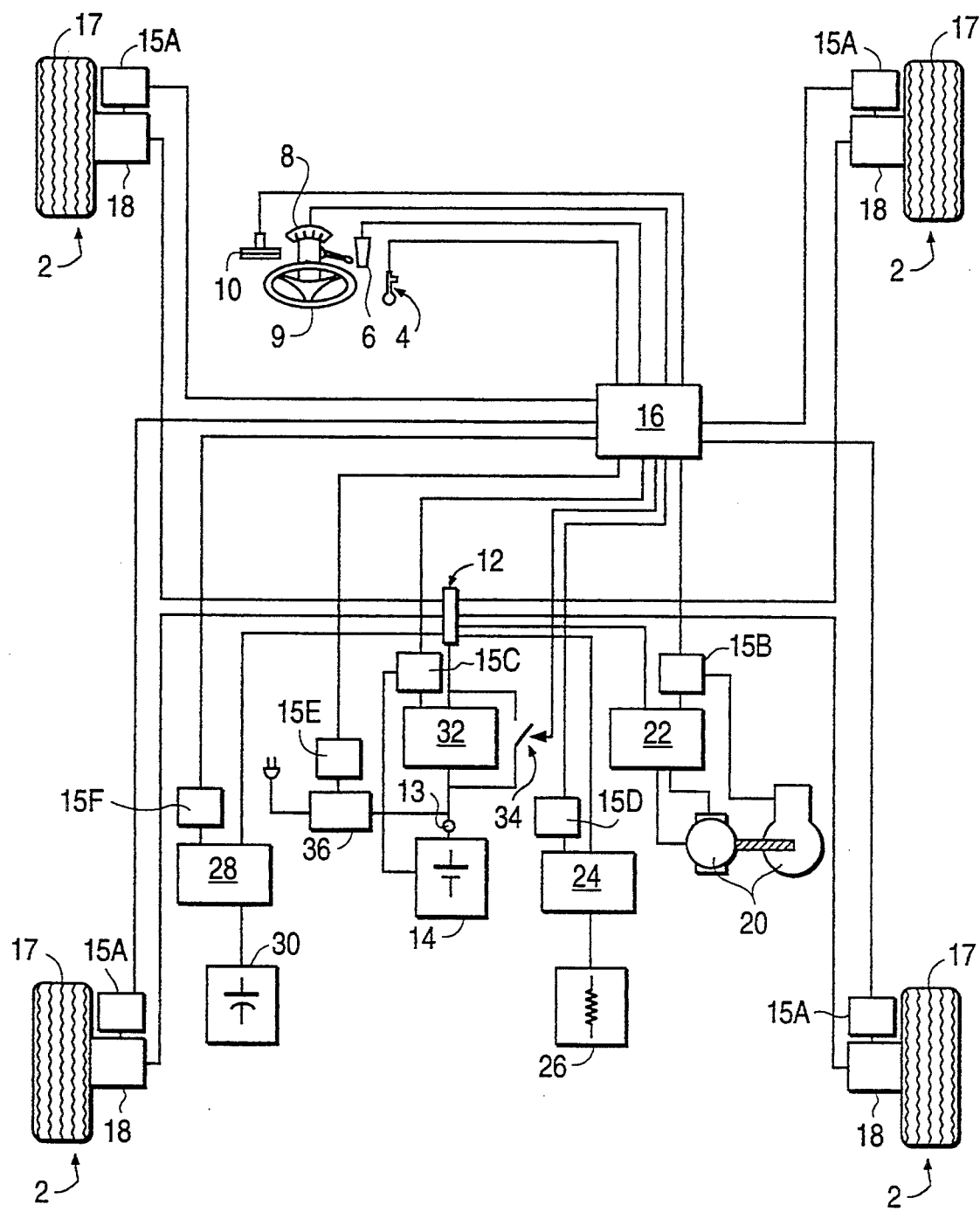
FIG. 1 is a schematic block diagram illustrating a motor vehicle drive system in accordance with the present invention.

Referring now to FIG. 1, there is shown a motor vehicle drive system for a motor vehicle having an electric motor system 2 supplied with electric power, an actuating system which is a start key system 4, an accelerator pedal system 6, a mode selector 8, a brake pedal system 10 and a power battery 14. The motor vehicle drive system comprises a power supply bus 12 having an output for supplying the electric motor system 2; a battery connector 13 for connection to the battery 14, the connector 13 having a power output for supplying the power supply bus 12; a controller system 15A, 15B, 15C, 15D, 15E, 15F and 16 having inputs respectively connected to the battery 14, the start key system 4, the accelerator pedal system 6, the mode selector 8, the brake pedal system 10 and the electric motor system 2 so that the controller system 15A, 15B, 15C, 15D, 15E, 15F and 16 can monitor their status, the controller system being made of a primary controller 16 and auxiliary controllers 15A, 15B, 15C, 15D, 15E and 15F but it can also be made of a single controller; and a power converter system 18 having a first input connected to the power supply bus 12, a second input connected to an output of the controller 15A by which operation of the power converter system can be controlled, and an output connected to the motor system 2 for supplying the motor system 2. In the present case, the motor system 2 is made of four motor wheels 17, such as the one described in U.S. patent application No. 913,021, filed on Jul. 14, 1992 in the name of the applicant, but the motor system can be made of one motor.

The mode selector 8 is the column-mounted shift lever by which the driver can shift the operation mode of the vehicle to park, reverse, neutral or drive. In the present case the power supply bus 12 is preferably a 500 volts DC bus but it can be a high voltage AC bus.

The motor vehicle drive system also comprises a combustion motor electric power supply 20 having an input connected to the controller 15B by which it is controlled and an output for producing alternating current. Also, there is provided a power converter 22 having an input connected to the output of the motor electric power supply 20, and an output for supplying the power supply bus 12. The controller 15B is connected to the power converter 22 so that it is monitored and controlled by the controller 15B. With the present motor vehicle drive system, the controller system 15A, 15B, 15C, 15D, 15E, 15F and 16 monitors and controls operation of the electric power system 2, and when auxiliary electric power is needed on said power supply bus, the controller system actuates the combustion motor electric power supply 20.

Normally, only the power battery 14 supplies energy to the power supply bus 12, the motor electric power supply 20 being normally turned off. Accordingly, the controller 15B is provided with the necessary means for turning on or off the motor electric power supply 20.

The motor vehicle comprises four wheels. The motor system 2 comprises four independently driven electric motor wheels 17 which constitute respectively the four wheels of the vehicle. The power converter system 18 is made of four power inverters associated respectively with the four motor wheels 17. Each of the power inverters has an input connected to the power supply bus 12, an input connected to the corresponding controller 15A, and an output connected to the corresponding motor wheel 17. The controllers 15A have inputs connected respectively to the motor wheels 17 for monitoring their operation, whereby each of the motor wheels 17 can be individually controlled by the corresponding controller 15A.

The motor vehicle drive system further comprises a voltage clamp 24 having an input connected to the power supply bus 12, and a resistive load 26 connected to an output of the voltage clamp 24 so that energy peaks present on the power supply bus 12 can be dissipated in the resistive load 26. The motor vehicle drive system further comprises another power converter 28 having an input connected to the power supply bus 12, and a peak load storage device 30 connected to an output of the power converter 28 so that energy peaks present on the power supply bus 12 can be stored in the storage device 30.

The motor vehicle drive system further comprises a step down/step up DC voltage regulator 32 having a first input/output connected to the power supply bus 12, and a second input/output connected to the power output of the battery 14. The regulator 32 is also connected to the controller 15C so that it can monitor its status and control its operation. Also, there is provided a power switch connection 34 connected in parallel to the regulator 32 and controlled by the controller 16 so that the regulator 32 can be by-passed by an operation of the power switch connection 34.

The motor vehicle drive system further comprises a battery charger 36 having an input for receiving AC or DC supply, and an output connected to the power output of the battery 14. The charger is also connected to the controller 15E so that the controller 15E can monitor its status and control its operation.

The combustion motor electric power supply 20 is an internal combustion motor electric power supply 20 which is preferably continuously running at constant speed when it is turned on. The power rating of the power supply 20 is determined by the necessary power to operate at highway cruising speed. The peak load storage device 30 can be either a capacitor or a flywheel.

Figure 2:
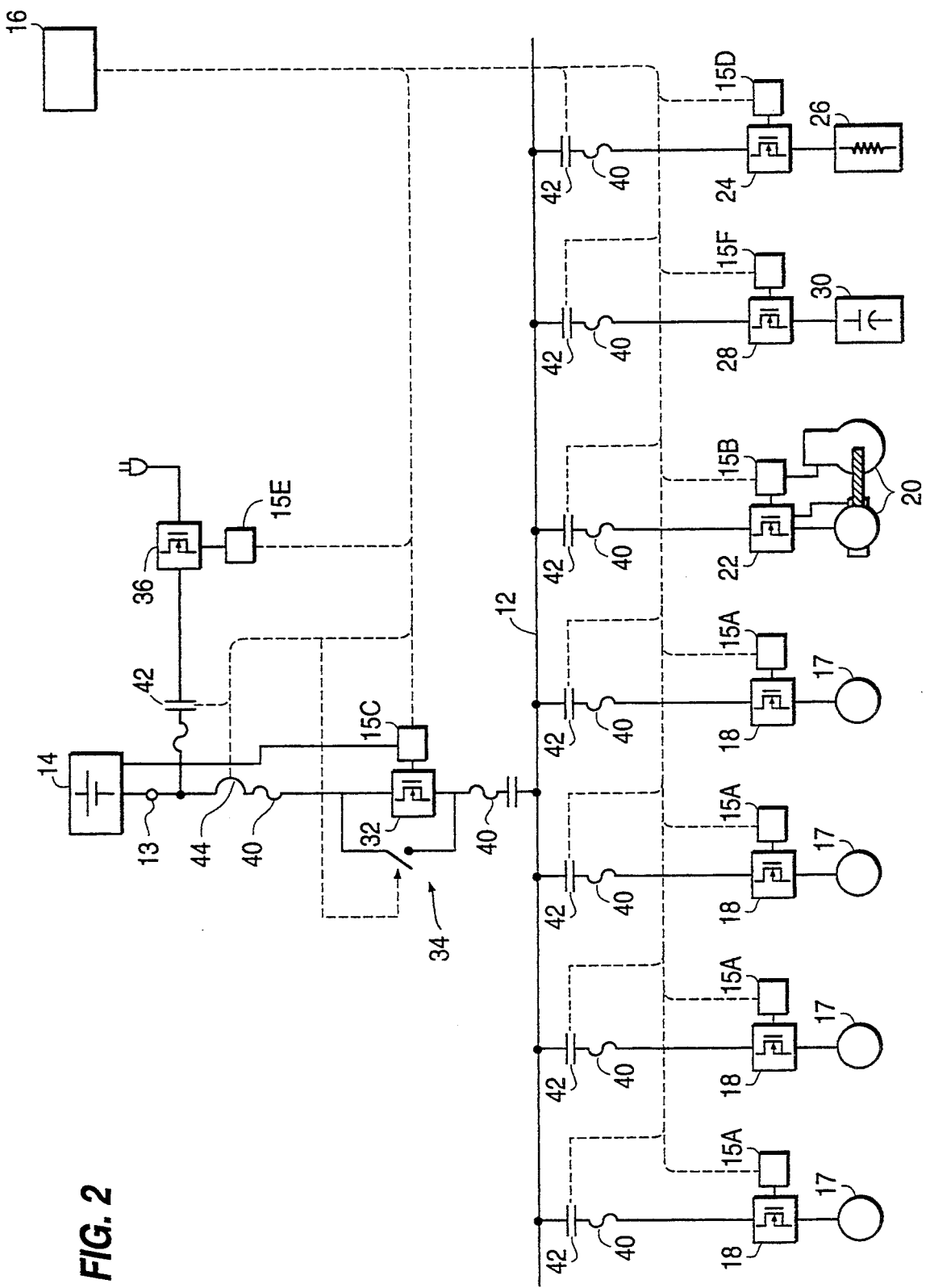
FIG. 2 is a schematic block diagram illustrating the embodiment of FIG. 1 with additional details.

Referring now to FIG. 2, there is shown the embodiment of FIG. 1 with additional details. In this FIG. 2, the reference numerals used in FIG. 1 are also used in this FIG. 2 for indicating similar elements. This embodiment is further provided with fuses 40 and relays 42 and 44 for protecting the parts of the system when it is not operating in an appropriate manner. The relay 44 is a power relay.

The present motor drive system is operated by providing primary power for driving motor wheels 17 of the battery 14; sensing when auxiliary power for motor wheels 17 is required by means of the controller system 15A, 15B, 15C, 15D, 15E, 15F and 16; and providing the auxiliary power to motor wheels 17 from the motor electric power supply 20.

Preferably, operation modes of the motor electric power supply 20 is controlled in relation to operation modes of the battery 14.

The embodiment shown in FIGS. 1 and 2 describes a series hybrid electric vehicle. This hybrid vehicle is based on the use of a battery 14 having sufficient power to give the vehicle good performance and an acceptable range when operating in electric mode only. The power battery 14 is relatively small in comparison to a conventional electric vehicle storage battery, and it supplies four motor wheels 17. This reduces the weight and bulk of the vehicle. The motor electric power supply 20 with the power converter 22 supply power to the motor wheels 17 and to the battery 14. A bidirectional step down/step up regulator 32 provided between the battery 14 and the motor wheels 17 optimizes the power drawn from the battery 14 and provides the desired voltage independently of the charge state of the battery 14 or the battery current/voltage function. The regulator 32 optimizes the supply voltage of the motors 17 in order to minimize the losses while optimizing the use of the motor wheel wiring and power converter system 18. At low speeds, a switch connection 34 is used to eliminate use of the regulator 32 and to reduce the losses.

During regenerative braking the regulator 32 adjusts the rate of battery charging. In case of electrical system breakdown, it can isolate the battery 14 from the rest of the circuit. A voltage clamp 24 connected to a resistance 26 limits the voltage to a predetermined value by dissipating excess power in the resistance 26. A power converter 28 connected to a capacitor 30 stores excess power and reuses it when needed. A battery charger 36 on board the vehicle having a unit power factor recharges the battery 14 from the mains. The controller system is made of a main controller 16 communicating with auxiliary controllers 15A, 15B, 15C, 15D, 15E and 15F associated with components of the drive system. This main controller 16 controls the flow of energy between the battery 14, the motor electric power supply 20, the motor wheels 17, the voltage clamp 24 or the storing capacitor 30 by using, as is needed, the voltage regulator 32 in order to optimize efficiency. Furthermore, this main controller 16 coordinates the operation of the motor wheels 17 as a function of the signals received from the brake pedal system 10, accelerator pedal system 6, the mode selector 8 and the steering wheel 9 in order to produce various vehicle operations such as regenerative braking, antilock braking, no-slip traction, anti-roll-back, and differential drive.

Although the present invention has been explained hereinabove by way of a preferred embodiment thereof, it should be pointed out that any modifications to this preferred embodiment, within the scope of the appended claims is not deemed to change or alter the nature and scope of the present invention.

We claim:

1. A motor vehicle drive system for a motor vehicle having an electric motor system, an actuating system, an accelerator system, a mode selector, a battery and four wheels, comprising:

four independently driven electric motor wheels which constitute respectively said four wheels of said vehicle;

a power supply bus having an output for supplying power to said electric motor system, said power supply bus being a DC power supply bus;

a battery connector for connection to said battery, said connector having a power output for supplying said power supply bus;

a controller system supplying at least one output, having inputs respectively for connection to said battery, said actuating system, said accelerator system, said mode selector and said electric motor system so that said controller system can monitor a status thereof, said controller system also having inputs connected respectively to said motor wheels for monitoring an operation thereof, whereby each of said motor wheels can be individually controlled by said controller system;

a power converter system having a first input connected to said power bus, a second input connected to said at least one output of said controller system, operation of said power converter system being controlled by said controller system, said power converter system having an output connected to said motor system for supplying power to said motor system, said power converter system also comprising four power inverters associated respectively with a corresponding one of said four motor wheels, wherein each of said power inverters has a first input connected to said power supply bus, a second input connected to said controller system, and an output connected to the corresponding one of said motor wheels;

a combustion motor electric power supply having an input connected to said at least one output of said controller system, operation of said power supply being controlled by said controller system, said combustion motor electric power supply having an output for producing current; and a first power converter having an input connected to said output of said power supply, and said power converter having an output for supplying power to said power supply bus, said controller system being connected to said power converter so that said power converter is monitored and controlled by said controller system, whereby said controller system monitors and controls operation of said electric motor system and, when an auxiliary electric power is needed on said power supply bus, said controller system activates operation of said combustion power supply.

2. A motor vehicle drive system according to claim 1, further comprising:

a voltage clamp having an output, and having an input connected to said power supply bus, and a resistive load connected to said output of said voltage clamp so that energy peaks present in said power supply bus can be dissipated in said resistive load.

3. A motor vehicle drive system according to claim 2, further comprising:

a step down/step up DC voltage regulator having a first input/output connected to said power supply bus, and a second input/output connected to said power output of said battery connector, said regulator being also connected to said controller system so that said controller system can monitor said status thereof and control said operation thereof; and a power switch connection connected in parallel to said regulator and controlled by said controller system so that said regulator can be by-passed by an operation of said power switch connection.

4. A motor vehicle drive system according to claim 1, further comprising:
   a second power converter having an output, and having an input connected to said power supply bus, and
   a peak load storage device connected to said output of said second power converter so that energy peaks present in said power supply bus can be stored in said storage device.

5. A motor vehicle drive system according to claim 4, wherein said peak load storage device is a capacitor.

6. A motor vehicle drive system according to claim 4, wherein said peak load storage device is a flywheel.

7. A motor vehicle drive system according to claim 1, further comprising:
   a step down/step up DC voltage regulator having a first input/output connected to said power supply bus, and a second input/output connected to said power output of said battery connector, said regulator being also connected to said controller system so that said controller system can monitor a status of the regulator and control an operation thereof; and
   - a power switch connection connected in parallel to said regulator and controlled by said controller system so that said regulator can be by-passed by an operation of said power switch connection.

8. A motor vehicle drive system according to claim 1, further comprising a battery charger having an input for receiving an AC supply, and an output connected to said power output of said battery connector, said charger being also connected to said controller system so that said controller system can monitor a status thereof and control an operation thereof.

9. A motor vehicle drive system according to claim 1, wherein said combustion motor electric power supply is an internal combustion motor electric power supply which is continually running at constant speed when said motor electric power supply is turned on.

10. A motor vehicle drive system according to claim 1, wherein said vehicle has a brake pedal system, and said converter system is connected to said brake pedal system for monitoring its status.

11. A motor vehicle drive system according to claim 1, in combination with said battery, wherein said battery is a power battery.

12. A method of operating a motor vehicle drive system of a motor vehicle having an electric motor system, an actuating system, an accelerator system, a mode selector and a battery, the electric motor system comprising four independently driven electric motor wheels which constitute respectively four wheels of said vehicle, said method comprising the steps of:
   supplying power to a supply bus of said motor vehicle drive system from said battery;
   monitoring said battery, said actuating system, said accelerator system, said mode selector and said electric motor system by a controller system of said motor vehicle drive system from inputs connected to the battery, the actuating system, the accelerator system, the mode selector and the electric motor system;
   individually controlling each of the motor wheels of said electric motor system by controlling with the controller system four power inverters associated respectively with said four motor wheels, each of said power inverters having a first input connected to said power supply bus, a second input connected to said controller system and an output connected to the corresponding motor wheel;
   individually monitoring an operation of said motor wheels by said controller system from inputs connected respectively to the associated power inverters whereby, in operation, said motor wheels are individually controlled and monitored;
   controlling by said controller system a combustion motor electric power supply having an output for producing current; and
   monitoring and controlling by said controller system a first power converter having an input connected to the output of the power supply and an output for supplying the power supply bus when auxiliary electric power is needed on the power supply bus.

* * * * *